United States Patent [19]

Henline

[11] Patent Number: 4,947,956
[45] Date of Patent: Aug. 14, 1990

[54] HYDROSTATIC TRANSMISSIONS SYSTEM FOR AN ARTICULATED VEHICLE

[75] Inventor: John W. Henline, Lisbon, N. Dak.

[73] Assignee: Clark Equipment Company, South Bend, Ind.

[21] Appl. No.: 455,940

[22] Filed: Dec. 21, 1989

Related U.S. Application Data

[63] Continuation of Ser. No. 107,784, Oct. 13, 1987, abandoned.

[51] Int. Cl.⁵ .............................................. B60K 17/358
[52] U.S. Cl. ..................................... 180/235; 74/731.1; 74/733.1; 180/242; 180/307
[58] Field of Search ............... 180/305, 306, 307, 308, 180/235, 242; 74/730.1, 731.1, 732.1, 733.1, 810.1, 810.2

[56] References Cited

U.S. PATENT DOCUMENTS

| | | | |
|---|---|---|---|
| 2,406,944 | 9/1946 | Choate et al. | 180/51 |
| 3,061,030 | 10/1962 | Shallenberg | 180/12 |
| 3,157,239 | 11/1964 | Bernotas | 180/51 |
| 3,263,767 | 8/1966 | Rockwell | 180/77 |
| 3,334,702 | 8/1967 | Granryd | 180/51 |
| 3,344,688 | 10/1967 | Frost | 74/711 |
| 3,451,494 | 6/1969 | Kowalik | 180/9.24 |
| 3,484,964 | 12/1969 | Jeffrey, Jr. | 37/117.5 |
| 3,552,516 | 1/1971 | Beard | 180/308 |
| 3,568,778 | 3/1971 | Swisher, Jr. et al. | 172/785 |
| 3,623,320 | 11/1971 | Moore | 60/52 |
| 3,656,570 | 4/1972 | Gortnar et al. | 180/308 |
| 3,672,460 | 6/1972 | Takata | 180/79.2 |
| 3,910,369 | 10/1975 | Chichester et al. | 180/44 |
| 3,994,353 | 11/1976 | Greene | 180/307 |
| 4,074,782 | 2/1978 | Bauer | 180/6.48 |
| 4,116,294 | 9/1978 | Johnston | 180/907 |
| 4,171,028 | 10/1979 | van der Lely | 180/235 |
| 4,185,713 | 1/1980 | Williams et al. | 180/308 |
| 4,207,691 | 6/1980 | Hyler et al. | 37/124 |
| 4,424,878 | 1/1984 | van der Lely | 180/235 |
| 4,505,353 | 3/1985 | van der Lely | 180/235 |
| 4,649,706 | 3/1987 | Hutson | 91/520 |
| 4,699,234 | 10/1987 | Shinozaki et al. | 180/233 |

FOREIGN PATENT DOCUMENTS 3107991 9/1982 Fed. Rep. of Germany ...... 180/305

Primary Examiner—Charles A. Marmor
Assistant Examiner—Eric Culbreth
Attorney, Agent, or Firm—Kinney & Lange

[57] ABSTRACT

A hydrostatic drive vehicle includes an articulated frame formed by forward and rearward transmission cases which are pivotally joined. A first set of wheels is rotatably mounted to the forward transmission case, while a second set of wheels is rotatably mounted to the rearward transmission case. A first hydraulic motor is coupled to the first set of wheels by a chain reduction linkage and limited slip differential which are mounted within the forward transmission case. A second hydraulic motor is coupled to the second set of wheels by a chain reduction linkage and limited slip differential mounted within the rearward transmission case. An engine and hydraulic pump are mounted to the frame. The first and second hydraulic motors are coupled to the hydraulic pump in a series hydraulic circuit.

4 Claims, 2 Drawing Sheets

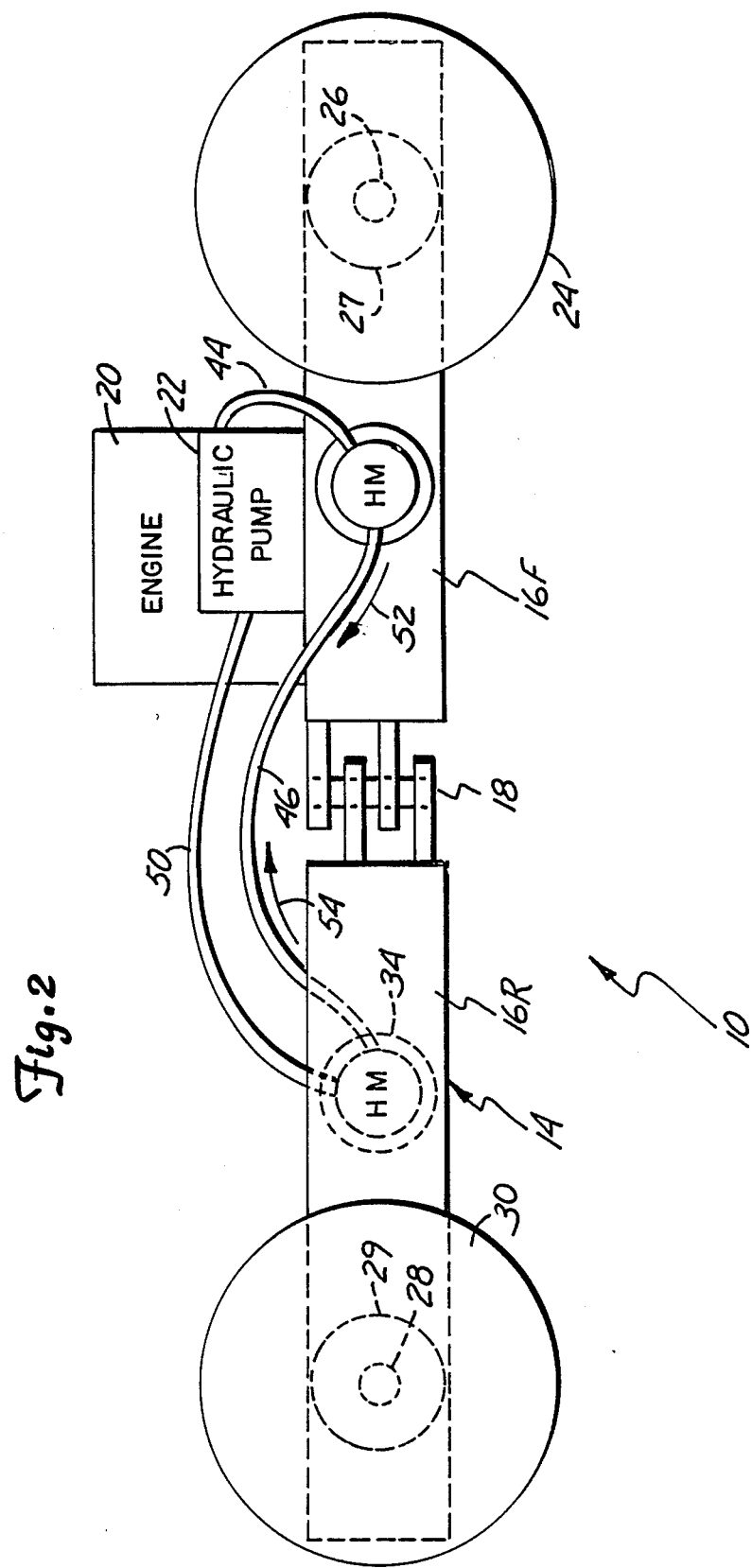

ately powered by its own hydraulic pump.
HYDROSTATIC TRANSMISSIONS SYSTEM FOR AN ARTICULATED VEHICLE This is a continuation of application Ser. No. 071107,784, filed Oct. 13, 1987 (now abandoned).

BACKGROUND OF THE INVENTION

1. Field of the Invention

The present invention relates to hydrostatic drive systems for vehicles.

2. Description of the Prior Art

Vehicles with hydrostatic transmissions are in widespread use. Drive trains of this type typically include a reversible variable displacement hydraulic pump which is driven by an engine. In one conventional design, fluid from the hydraulic pump is provided to a single hydraulic motor which is mounted to a gear box. The gear box is coupled to each of two sets of drive wheels through universal joint shafts, differentials, and axles. Vehicle speed and direction are controlled by the volume and direction of fluid displaced by the pump. A separate frame to support the vehicle and hold the drive train is required. Rotating drive train parts are exposed to damage by obstacles and wrapping by debris.

The hydraulic drive control system of a skid steer loader is disclosed in the Bauer U.S. Pat. No. 4,074,782. This drive system includes a transmission case with a hydraulic motor mounted to each of its opposite sides. Each hydraulic motor is coupled to both the forward and rearward wheels on that side of the loader by a gear reduction mechanism and chain linkage. The gear reduction mechanism and chain linkage are enclosed within the transmission case. Each motor is coupled to and separately powered by its own hydraulic pump.

The Jeffery U.S. Pat. No. 3,484,964 discloses a hydrostatic transmission system in which a front motor and rear motor are connected in parallel with a main hydraulic pump. When one axle on a vehicle of this type loses traction, all of the hydraulic fluid will flow to the motor from which it is driven, taking the path of least resistance. No pressure or torque remains for the axle with traction. The machine can stall under these circumstances.

The Chichester et al. U.S. Pat. No. 3,910,369 discloses a hydrostatic transmission system for an articulated vehicle. Like that of the Jeffery patent discussed immediately above, this system utilizes two hydraulic motors which are connected in parallel to the hydraulic pump. Flow dividers are provided in the Chichester et al. system to maintain equal fluid flow to each motor. Should one axle or wheel lose traction, the pump will continue to supply fluid at high pressure to the axle or wheels with traction. However, the energy in the fluid provided to the axle or wheels with no traction is lost as heat since no work is done. Energy is therefore wasted.

It is evident that there is a continuing need for improved hydrostatic transmission systems for vehicles. In particular, there is always room for more compact and energy-efficient transmission systems.

SUMMARY OF THE INVENTION

A hydrostatic drive vehicle in accordance with the present invention includes a frame with first and second sets of wheels rotatably mounted thereto. A first hydraulic motor is coupled to the first set of wheels by a first drive linkage. A second hydraulic motor is coupled to the second set of wheels by a second drive linkage. An engine and a reversible variable displacement hydraulic pump are also mounted to the frame. Fluid transmission means couple the first and second hydraulic motors to the hydraulic pump in a series hydraulic circuit.

Since both hydraulic motors are coupled in series with the hydraulic pump, energy in the form of pressurized fluid will be utilized by the hydraulic motors only as needed. Energy is therefore efficiently used, while torque is automatically proportioned between the wheels as required.

BRIEF DESCRIPTION OF THE DRAWINGS

FIG. 2 is a side view of the vehicle illustrated in FIG. 1.

DETAILED DESCRIPTION OF THE PREFERRED EMBODIMENTS

Figure 1:
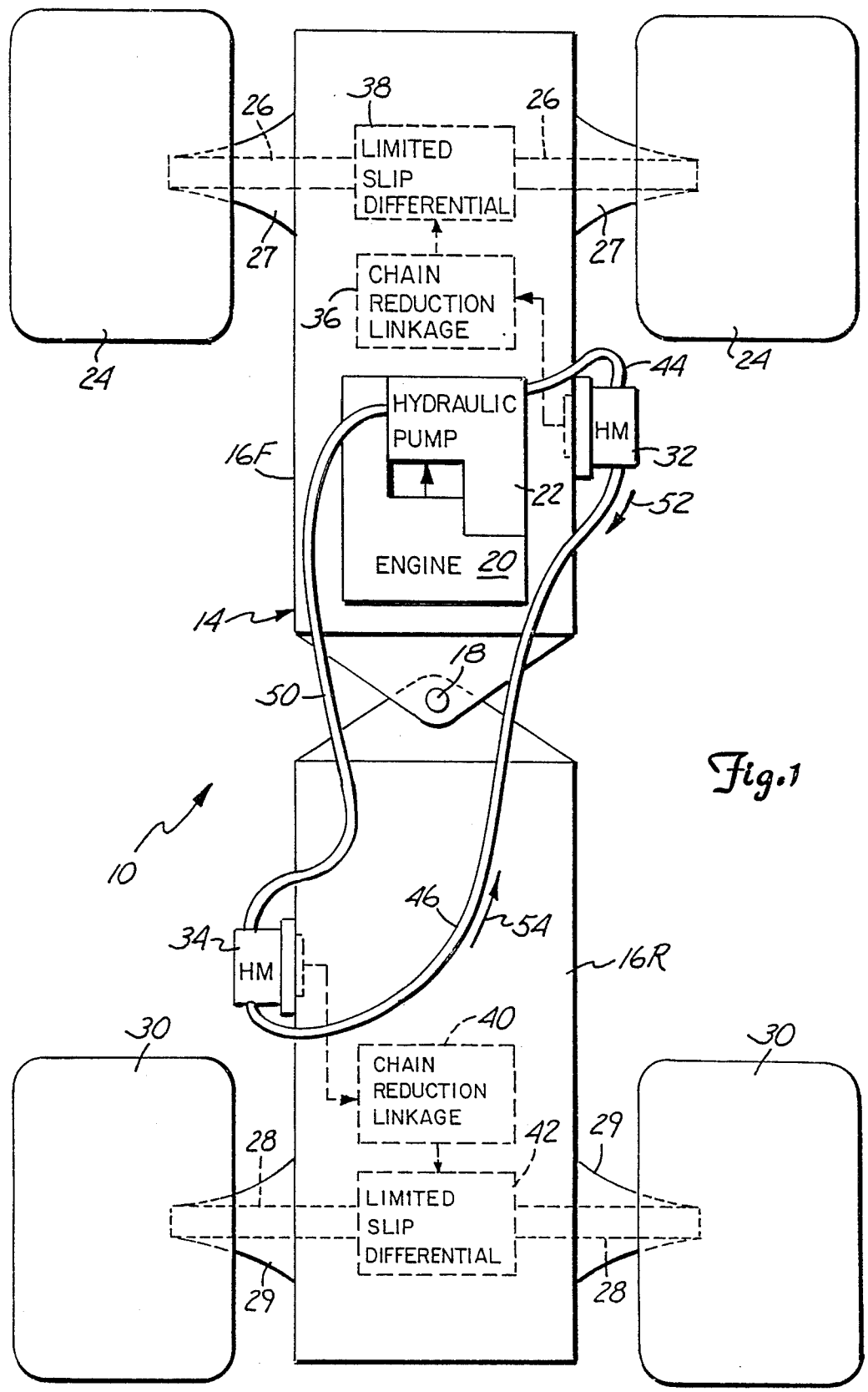
FIG. 1 is a schematic and block diagram representation of a vehicle, taken from the top, which includes a hydrostatic transmission system in accordance with the present invention.

An articulated vehicle 10 in accordance with the present invention is illustrated generally in FIGS. 1 and 2. Vehicle 10 includes an articulated frame 14 formed by a forward transmission case 16F and a rearward transmission case 16R which are pivotally connected by vertically oriented pin 18. Transmission cases 16F and 16R are closed structures formed by top, bottom, side and end walls which can be welded together. Access to the interior of cases 16F and 16R is gained through removable covers (not shown) on the top wall.

Engine 20 and reversible variable displacement hydraulic pump 22 are mounted to forward tranmission case 16F in the embodiment shown. Hydraulic pump 22 can be connected to a hydraulic fluid reservoir and/or charge pump (not shown) in a conventional manner. A first or forward pair of wheels 24 are rotatably mounted to forward transmission case 16F by means of axle 26. Outer ends of axle 26 are supported by and housed within axle castings 27. A second or rearward pair of wheels 30 are rotatably mounted to rearward transmission case 16R by axle 28. Axle 28 is supported on transmission case 16R by castings 29. Vehicle 10 is supported for over-the-ground travel by wheels 24 and 30.

A first hydraulic motor (HM) 32 is mounted to a side wall of forward transmission case 16F, while a second hydraulic motor 34 is mounted to a side wall of rearward transmission case 16R. Hydraulic motor 32 is coupled to axle 26 within transmission case 16F by a power transmission system including chain reduction linkage 36 and limited slip differential 38. Motion from hydraulic motor 34 is similarly transmitted to axle 28 by chain reduction linkage 40 and limited slip differential 42.

Hydraulic pump 22 is coupled to hydraulic motors 32 and 34 in a series hydraulic circuit by means of hydraulic hoses 44, 46 and 50. Hose 44 transmits hydraulic fluid between hydraulic pump 22 and hydraulic motor 32. Hydraulic fluid is transmitted between first hydraulic motor 32 and second hydraulic motor 34 by hose 46. Hose 50 couples hydraulic pump 22 to hydraulic motor 34.

When it is desired to drive vehicle 10 in a first (e.g. forward) direction, an operator will actuate a foot pedal or other control mechanism (not shown) in such a manner as to stroke hydralic pump 22 in a first direction. In response, hydraulic pump 22 will force hydraulic fluid under pressure through hydraulic motors 32 and 34 in a first direction 52. Fluid will thereby flow from hydraulic pump 22 to hydraulic motor 32, and from hydraulic motor 32 to hydraulic motor 34. From motor 34, the fluid is returned to hydraulic pump 22. The rotational motion of hydraulic motors 32 and 34 is coupled to wheels 24 and 30, respectively, and causes them to rotate a first direction. The extent to which hydraulic pump 22 is stroked in the first direction controls the amount of hydraulic fluid flowing through motors 32 and 34, and thereby the speed at which vehicle 10 is driven in its forward direction.

To drive vehicle 10 in a second (e.g. reverse) direction, the operator will rotate the foot pedal (not shown) in a manner causing hydraulic pump 22 to be stroked in a second direction. In response, hydraulic pump 22 forces hydraulic fluid in a second direction 54 through hydraulic motor 34 and hydraulic motor 32, before it is returned to the hydraulic pump. This flow of hydraulic fluid in the second direction causes wheels 24 and 30 to rotate in the second direction. Again, the extent to which hydraulic pump 22 is stroked in the second direction controls the amount of hydraulic fluid flow and thereby speed at which vehicle 10 is driven in the second direction.

Vehicles such as that of the present invention have considerable advantages over those known in the art. Since both hydraulic motors are coupled in series with hydraulic pump 22, energy in the form of pressurized fluid will be utilized by hydraulic motors 32 and 34 only as needed. Should one or the other of wheels 24 or 30 lose traction, its associated hydraulic motor 32 and 34, respectively, will use less energy, thereby permitting the energy to be provided to the wheels with no traction loss as needed. A smaller hydraulic pump than that required if both hydraulic motors are driven in parallel can also be used since a smaller volume of fluid need be provided. Flow dividers are not required. Torque is automatically proportioned between the wheels as required. Vehicle 10 is also more energy efficient and less complex than those of the prior art. Frame 14 is formed by the transmission cases 16F and 16R, thereby further reducing vehicle complexity. Drive train elements are enclosed by the transmission case and protected from obstacles.

Although the present invention has been described with reference to the preferred embodiments, those skilled in the art will recognize that changes may be made in form and detail without departing from the spirit and scope of the invention.

What is claimed is:

1. A hydrostatic drive vehicle, including:
    a forward closed transmission case;
    a rearward closed transmission case;
    pivot means for pivotally connecting the forward transmission case directly to the rearward transmission case;
    a forward pair of wheels rotatably mounted to the forward transmission case;
    a rearward pair of wheels rotatably mounted to the rearward transmission case;
    a first primary drive hydraulic motor mounted to the forward transmission case;
    a second primary drive hydraulic motor mounted to the rearward transmission case;
    a first drive linkage mounted within the forward transmission case and coupling the first hydraulic motor to the forward pair of wheels;
    a second drive linkage mounted within the rearward transmission case and coupling the second hydraulic motor to the rearward pair of wheels;
    an engine mounted to an exterior portion of one of the forward and rearward transmission cases;
    a reversible, variable displacement, primary drive hydraulic pump mounted to an exterior portion of one of the forward and rearward transmission cases and coupled to the engine; and
    hydraulic hoses coupling the first and second hydraulic motors to the hydraulic pump in a series hydraulic circuit.

2. The vehicle of claim 1 wherein the first and second drive linkages include a chain reduction linkage.

3. The vehicle of claim 1 wherein the first and second drive linkages include a limited slip differential.

4. The vehicle of claim 1 wherein the hydraulic hoses include:
    a first hose section coupling the hydraulic pump to the first hydraulic motor;
    a second hose section coupling the first hydraulic motor to the second hydraulic motor; and
    a third hose section coupling the second hydraulic motor to the hydraulic pump.

* * * * *